(12) United States Patent
Chen et al.

(10) Patent No.: US 8,514,554 B2
(45) Date of Patent: Aug. 20, 2013

(54) DISPLAY MODULE

(75) Inventors: Dong-Sen Chen, Taipei (TW);
Chun-Hsien Yu, Taipei (TW);
Ming-Jheng Huang, Taipei (TW);
Chun-Chi Lin, Taipei (TW)

(73) Assignee: Inventec Corporation, Taipei (TW)

( * ) Notice: Subject to any disclaimer, the term of this patent is extended or adjusted under 35 U.S.C. 154(b) by 265 days.

(21) Appl. No.: 13/075,196

(22) Filed: Mar. 30, 2011

(65) Prior Publication Data
US 2012/0170178 A1    Jul. 5, 2012

(30) Foreign Application Priority Data
Jan. 5, 2011    (TW) .............................. 100100363 A

(51) Int. Cl.
*H05K 7/00*    (2006.01)

(52) U.S. Cl.
USPC ............ 361/679.01; 361/679.02; 361/679.21; 361/679.58; 361/752; 361/825; 349/58; 349/65; 348/836

(58) Field of Classification Search
USPC .................. 361/679.21–679.3, 752, 753, 816, 361/818, 679.55–56; 174/520–525, 51, 177; 349/58–60
See application file for complete search history.

(56) References Cited

U.S. PATENT DOCUMENTS

| | | | |
|---|---|---|---|
| 2004/0195783 A1* | 10/2004 | Akagi et al. | 277/645 |
| 2005/0168930 A1* | 8/2005 | Kim et al. | 361/683 |
| 2009/0207579 A1* | 8/2009 | Boetto et al. | 361/818 |
| 2010/0008531 A1* | 1/2010 | Yang et al. | 381/380 |
| 2011/0013347 A1* | 1/2011 | Kinjou | 361/679.01 |

\* cited by examiner

*Primary Examiner* — Tuan T Dinh
*Assistant Examiner* — Mukund G Patel
(74) *Attorney, Agent, or Firm* — CKC & Partners Co., Ltd.

(57) ABSTRACT

A display module includes a front frame, a resilient member, a rear housing, and a first fastening member. The front frame includes a circular groove, and a first disassembly hole. The first disassembly hole is located in the circular groove. A part of the resilient member is detachably engaged in the circular groove and covers the first disassembly hole. The rear housing includes a first assembly hole, a second disassembly hole, and a trimming board. The first disassembly hole communicates with the second disassembly hole. The trimming board is used for covering the first assembly hole and the second disassembly hole. The first fastening member is used for fastening the rear housing to the front frame through the first assembly hole.

7 Claims, 5 Drawing Sheets

DISPLAY MODULE

RELATED APPLICATIONS

This application claims priority to Taiwan Application Serial Number 100100363, filed Jan. 5, 2011, which is herein incorporated by reference.

BACKGROUND

1. Field of Invention

The present invention relates to a display module.

2. Description of Related Art

In recent years, owing to the rapid developments in the electronic and information industries, the related products are increasingly sophisticated. In the field of present personal computer, in addition to find a faster and more powerful computing unit to cooperate with various kinds of peripheral equipment to meet users demands, the portable computer with compact size is also the development objective of the industries.

For example, because of having advantages such as high definition, small volume, light weight, low driving voltage, low power consumption, and wide range of applications, LCD monitors become the mainstream of displays and are widely applied in consumer electronics products such as portable televisions, mobile phones, camcorders, notebook computers, desktop monitors, and etc.

The LCD monitor (especially the flat display module attached with glass) applied in a notebook computer primarily includes a rear housing, a front frame, and a LCD panel. The LCD panel is installed on the front frame. The rear housing of the LCD monitor can be made of plastic and formed to be thin shell by injection molding. The front frame of the LCD monitor can be made of metal (such as aluminum) and formed to be thin shell by stamping. Afterwards, the front frame can be mounted to the rear housing. Besides, the front frame can include a hinge for connecting to the host of the notebook computer.

However, for the flat display module attached with glass nowadays, it is hard to fasten screws on the surface of the front frame or achieve the design that the appearance of the LCD monitor having no screw owing to the factors such as considerations of appearance, structural constraints, and etc. Therefore, the user has to see the screws fastened on the surface of the front frame. The screws that are disorderly fastened on the surface of the front frame may decrease the aesthetic feeling of the notebook computer. Moreover, after the ordinary operations of the user, the exposed screws may accumulate filth or rust because of contacting air directly.

SUMMARY

In order to solve the problems of prior arts, a display module according to an embodiment of the invention is provided. In order to achieve the design of hiding screws of the display module, the screw for fastening the rear housing to the front frame can be hid by the trimming board engaged on the rear housing. Besides, in order to disassemble the screw on the rear housing, the display module of the invention further includes a hidden disassembly hole on the front frame. The trimming board can be pushed apart from the rear housing through the disassembly hole, so as to expose the screw on the rear housing and thus the screw can be disassembled.

According to an embodiment of the invention, the display module includes a front frame, a resilient member, a rear housing, and a first fastening member. The front frame includes a frame body, a circular groove, and a first disassembly hole. The circular groove is disposed along a periphery of the frame body. The first disassembly hole is located in the circular groove. A part of the resilient member is detachably engaged in the circular groove and covers the first disassembly hole. The rear housing includes a housing body, a first assembly hole, a second disassembly hole, and a trimming board. The housing body is engaged with the frame body. The first assembly hole is located on the housing body. The second disassembly hole is located on the housing body and communicated with the first disassembly hole. The trimming board is engaged with the housing body and is for covering the first assembly hole and the second disassembly hole. The first fastening member is for fastening the rear housing to the front frame through the first assembly hole.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1A:
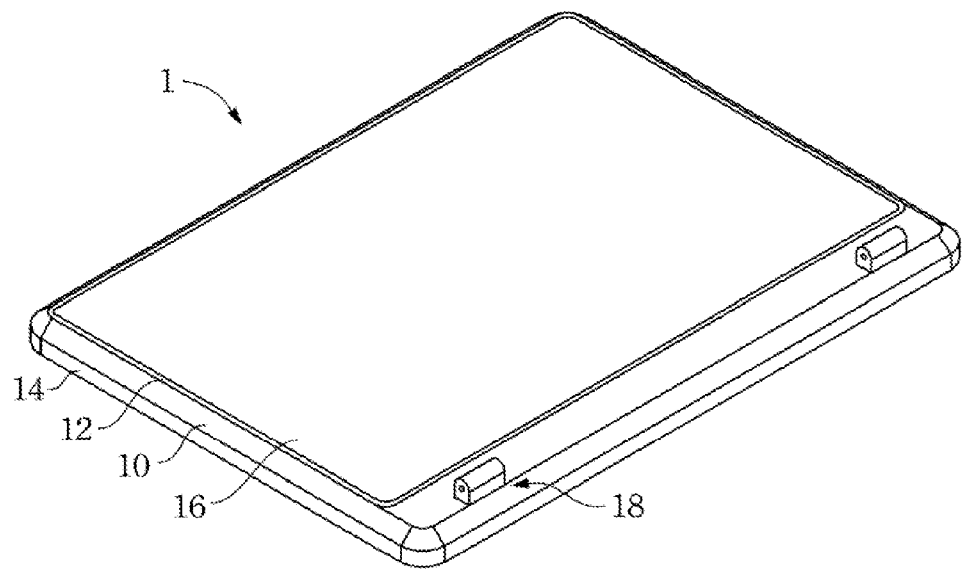
FIG. 1A is a stereoscopic view showing a display module according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

A display module according to an embodiment of the invention is provided. Specifically, in order to achieve the design of hiding screws of the display module, the screw for fastening the rear housing to the front frame can be hid by the trimming board engaged on the rear housing. Besides, in order to disassemble the screw on the rear housing, the display module of the invention further includes a hidden disassembly hole on the front frame. The trimming board can be pushed apart from the rear housing through the disassembly hole, so as to expose the screw on the rear housing and thus the screw can be disassembled.

Figure 1B:
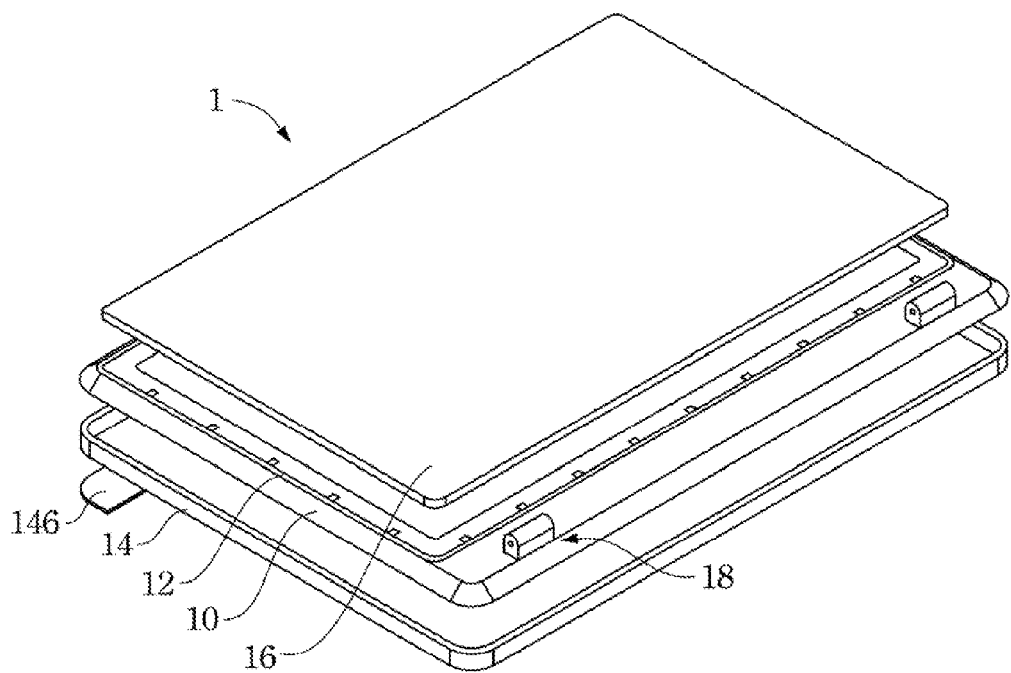
FIG. 1B is an exploded view showing the display module in FIG. 1A.

Please refer to FIG. 1A and FIG. 1B. FIG. 1A is a stereoscopic view showing a display module 1 according to an embodiment of the invention. FIG. 1B is an exploded view showing the display module 1 in FIG. 1A.

As shown in FIG. 1A and FIG. 1B, the electronic apparatus applies the display module 1 of the invention can be, but not limited to, a portable computer apparatus (e.g. a notebook computer, a tablet computer, and etc.) or a handheld electronic apparatus (e.g. PDA, mobile phone, game console, and etc.). In other words, the electronic apparatus applies the display module 1 of the invention can be any electronic product having a display. Electronic apparatuses that have the requirement of not exposing screws out of the displays can apply the concepts of the display module 1 disclosed by the invention to hide screws.

As shown in FIG. 1A and FIG. 1B, the display module 1 of the embodiment can include a front frame 10, a resilient member 12, a rear housing 14, a glass panel 16, and a hinge device 18. A part of the resilient member 12 is detachably engaged with the front frame 10. The rear housing 14 is also engaged with the front frame 10. The glass panel 16 is fixed to the front frame 10. For example, if an electronic apparatus is a notebook computer having flat display module attached with glass, the foregoing rear housing 14 can be the rear housing of the notebook computer, the foregoing front frame 10 can be the front frame of the notebook computer, and the hinge device 18 can be the hinge that pivotally connects the rear housing and the front frame to the host of the notebook computer. The structures and functions of all components of the display module 1 in the embodiment will be described in detail as followed.

Figure 2:
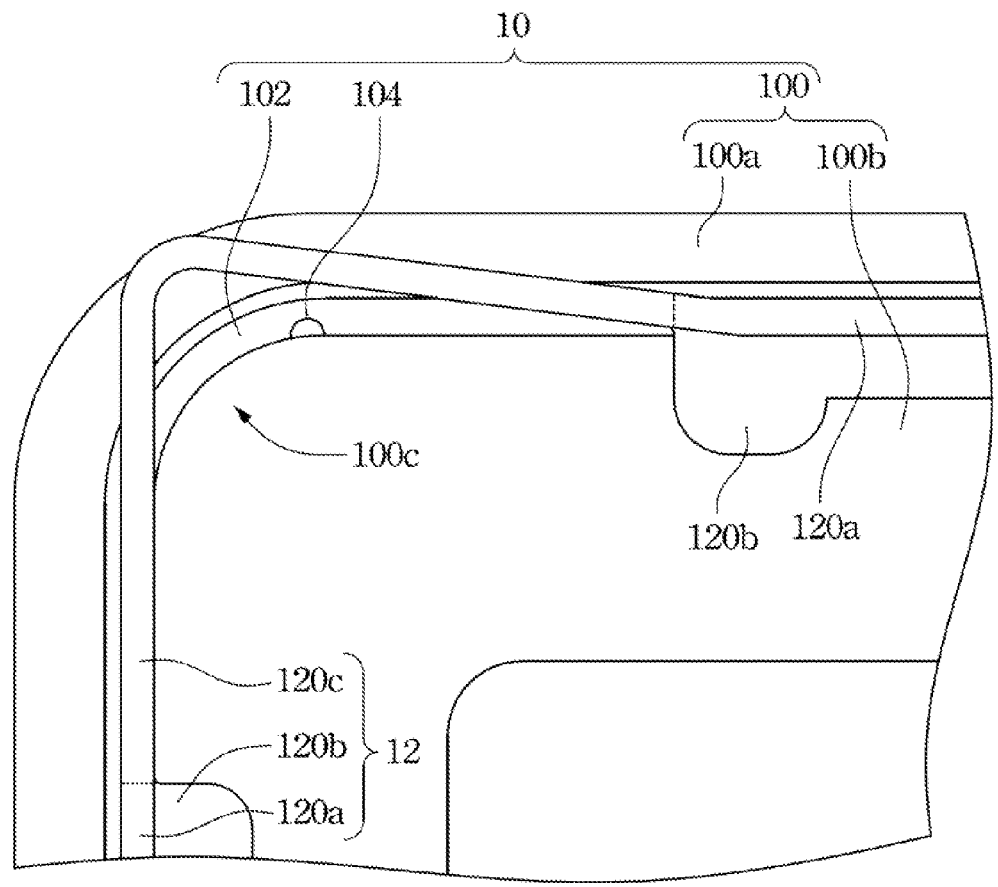
FIG. 2 is an enlarged view showing the display module near the corner of the frame body in FIG. 1A, wherein the pulling portion separates from the circular groove to expose the first disassembly hole.

Please refer to FIG. 2. FIG. 2 is an enlarged view showing the display module 1 near the corner 100c of the frame body 100 in FIG. 1A, wherein the pulling portion 120c separates from the circular groove 102 to expose the first disassembly hole 104.

As shown in FIG. 2, the front frame 10 in the display module 1 of the embodiment can further include a frame body 100, a circular groove 102, and a first disassembly hole 104. The circular groove 102 can be formed along a periphery of the frame body 100. The first disassembly hole 104 can be located in the circular groove 102. A part of the resilient member 12 is detachably engaged in the circular groove 102, so as to cover the first disassembly hole 104 in the circular groove 102. In the embodiment, the frame body 100 of the front frame 10 can further include an external wall 100a and a bearing portion 100b. The circular groove 102 of the front frame 10 can be located between the external wall 100a and the bearing portion 100b of the frame body 100. Therefore, the bearing portion 100b of the frame body 100 can be used to bear the glass panel 16 and fix the glass panel 16. In other words, when the glass panel 16 is fixed to the bearing portion 100b of the frame body 100, the resilient member 12 that is engaged in the circular groove 102 of the front frame 10 is also located between the external wall 100a of the frame body 100 and the glass panel 16. Of course, the first disassembly hole 104 is not necessary to be entirely located in the circular groove 102. In an embodiment, the first disassembly hole 104 can be partially located in the circular groove 102 and partially located on the bearing portion 100b of the frame body 100. Accordingly, the resilient member 12 can covers the part of the first disassembly hole 104 that is located in the circular groove 102, and the glass panel 16 can covers the part of the disassembly hole 104 that is located on the bearing portion 100b of the frame body 100.

As shown in FIG. 2, the resilient member 12 in the display module 1 of the embodiment can further include a buffer portion 120a and clamped portions 120b. The buffer portion 120a of the resilient member 12 is detachably engaged in the circular groove 102 and is located between the external wall 100a of the frame body 100 and the glass panel 16, so as to be used for covering the first disassembly hole 104. The clamped portions 120b of the resilient member 12 and the buffer portion 120a are connected to each other. The clamped portions 120b can be clamped between the glass panel 16 and the bearing portion 100b of the frame body 100, so as to prevent the resilient member 12 totally separating from the circular groove 102. The quantity of the clamped portions 120b of the resilient member 12 is not limited and can be adjusted according to the requirements of designing or restrictions of manufacturing.

Furthermore, the frame body 100 of the front frame 10 in the embodiment has a corner 100c. The first disassembly hole 104 of the front frame 10 can be located in the circular groove 102 and near the corner 100c of the frame body 100. The buffer portion 120a of the resilient member 12 can further include a pulling portion 120c. In another word, the pulling portion 120c is the part of the buffer portion 120a that is near the corner 100c and between the doted lines in FIG. 2. The pulling portion 120c of the buffer portion 120a is detachably engaged in the circular groove 102 and near the corner 100c for covering the first disassembly hole 104. Besides, the pulling portion 120c of the buffer portion 120a can be interconnected between two clamped portions 120b. Thus, during the operation of pulling the pulling portion 120c located at the corner 100c of the frame body 100 to separate from the circular groove 102, the resilient member 12 will not be pulled to entirely separate the circular groove 102 because the two clamped portions 120b connecting to the pulling portion 120c of the buffer portion 120a are clamped between the glass panel 16 and the bearing portion 100b of the frame body 100. Generally, the shape of a notebook computer is rectangular. That is to say, the front frame of the notebook computer substantially has four corners. Therefore, if the convenience of disassembly is concerned, the pulling portion 120c of the buffer portion 120a can be, but not limited to, selectively formed at the left upper corner or the right upper corner. That is to say, the quantities of the first disassembly hole 104 and the clamped portions 120b of the resilient member 12 are not limited and can be adjusted according to the requirements of designing or restrictions of manufacturing.

In the embodiment, the buffer portion 120a of the resilient member 12 can be circular. The circular groove 102 can be, but not limited to, adapted to entirely accommodate the buffer portion 120a of the resilient member 12 (as shown in FIG. 1A and FIG. 1B), and the buffer portion 120a of the resilient member 12 is located between the external wall 100a of the frame body 100 and the glass panel 16. For example, there can also be a plurality of resilient members disposed in the circular groove 102, as long as the resilient members can achieve the functions and goals of buffering between the external wall 100a of the frame body 100 and the glass panel 16 and covering the first disassembly hole 104 in the circular groove 102.

Figure 3:
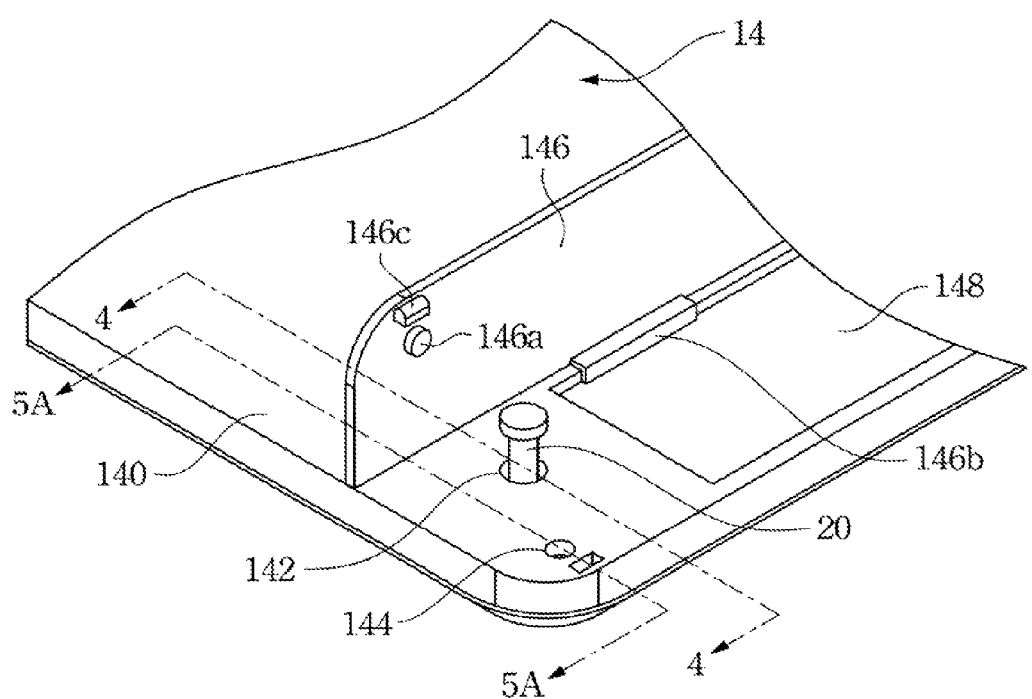
FIG. 3 is an enlarged view showing the rear housing and the front frame in FIG. 1A, wherein the trimming board has not engaged with the housing body, and the first fastening member has not been fastened in the first assembly hole.
Figure 4:
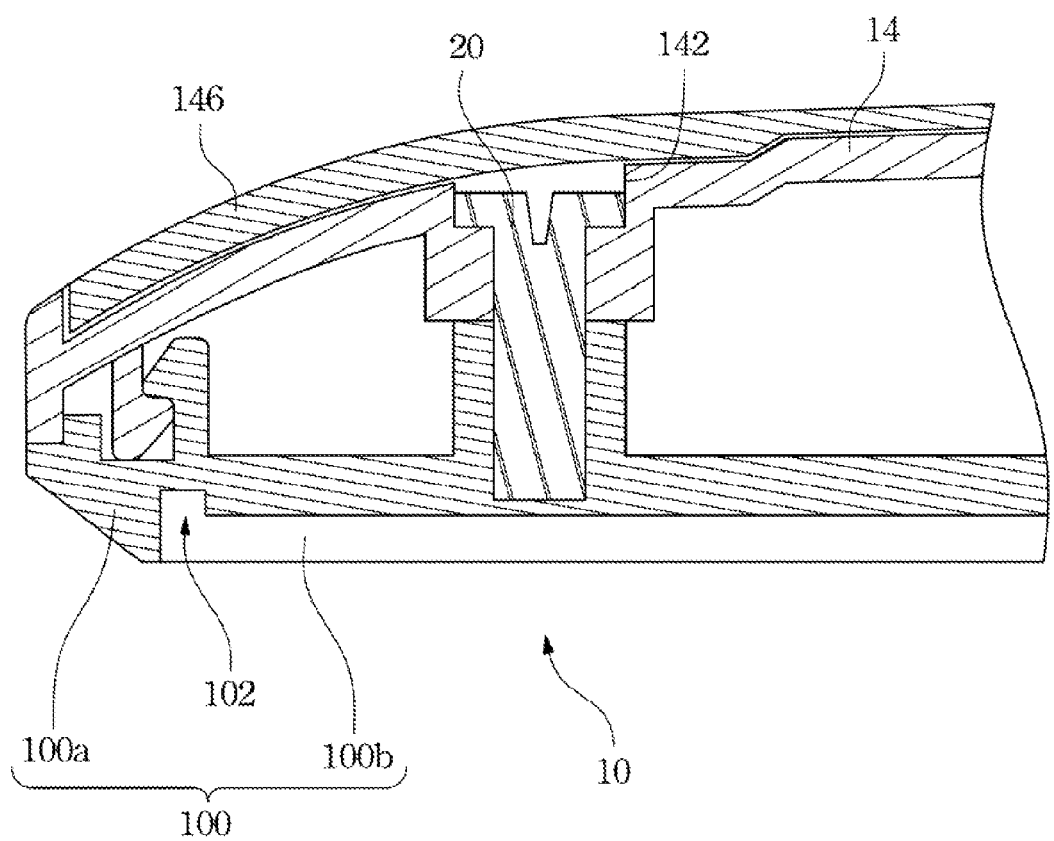
FIG. 4 is a section view showing the rear housing and the front frame in FIG. 3 along the line 4-4, wherein the trimming board has engaged with the housing body, and the first fastening member has been fastened in the first assembly hole.

Please refer to FIG. 3 and FIG. 4. FIG. 3 is an enlarged view showing the rear housing 14 and the front frame 10 in FIG. 1A, wherein the trimming board 146 has not engaged with the housing body 140, and the first fastening member 20 has not been fastened in the first assembly hole 142. FIG. 4 is a section view showing the rear housing 14 and the front frame 10 in FIG. 3 along the line 4-4, wherein the trimming board 146 has engaged with the housing body 140, and the first fastening member 20 has been fastened in the first assembly hole 142.

As shown in FIG. 3 and FIG. 4, the rear housing 14 in the display module 1 of the embodiment can further include a housing body 140, a first assembly hole 142, a second disassembly hole 144, a trimming board 146, and an opening groove 148. The housing body 140 of the rear housing 14 and the frame body 100 of the front frame 10 can be engaged to each other. The first assembly hole 142 of the rear housing 14 can be located on the housing body 140. The second disassembly hole 144 can also be located on the housing body 140. The trimming board 146 of the rear housing 14 and the housing body 140 can be engaged to each other. Furthermore, the trimming board 146 of the rear housing 14 can further include a longer first engagement structure 146b and a shorter engagement structure 146c. During the operation of engaging the trimming board 146 of the rear housing 14 to the housing body 140, the first engagement structure 146b of the trimming board 146 can be engaged into the opening groove 148 before engaging the second engagement structure 146c to the housing body 140. Thus, the trimming board 146 of the rear housing 14 can be used to cover the first assembly hole 142 and the second disassembly hole 144. Besides, the first fastening member 20 can be used for fastening the rear housing 14 to the front frame 10 through the first assembly hole 142. It can be seen that after the first fastening member 20 is fastened to the rear housing 14, the trimming board 146 engaged with the rear housing 14 can hide the first fastening member 20. In other words, no fastening member will be seen on the appearance of the rear housing 14, and the goal of the invention to hide screws can be achieved. In the embodiment, the foregoing first fastening member 20 can be, but not limited to, a screw. For example, the foregoing first fastening member 20 can also be a bolt, a pin, or other fastening member that has equivalent fastening effect.

Figure 5A:
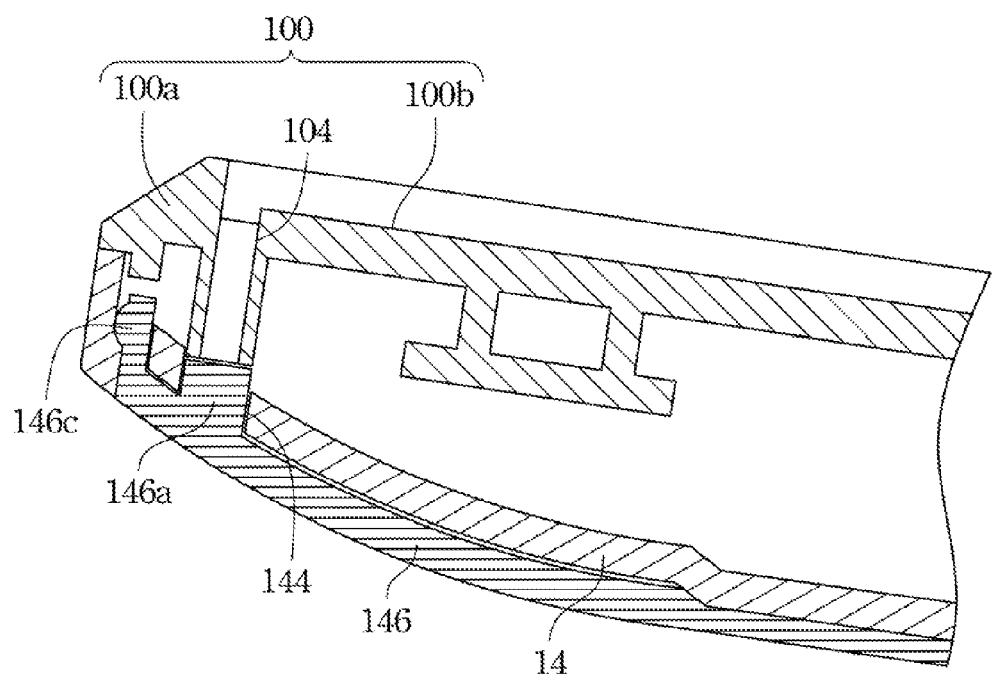
FIG. 5A is a section view showing the rear housing and the front frame in FIG. 3 along the line 5A-5A, wherein the trimming board has not separated from the housing body.
Figure 5B:
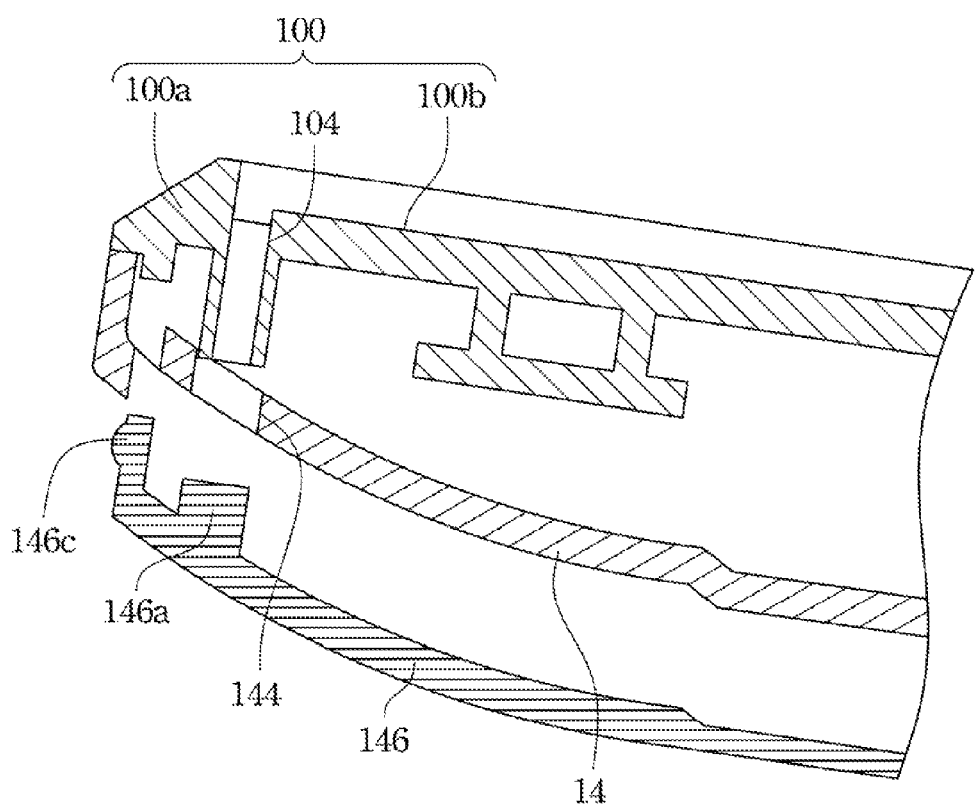
FIG. 5B is another section view showing the rear housing and the front frame in FIG. 5A, wherein the trimming board has separated from the housing body.

Please refer to FIG. 5A and FIG. 5B. FIG. 5A is a section view showing the rear housing 14 and the front frame 10 in FIG. 3 along the line 5A-5A, wherein the trimming board 146 has not separated from the housing body 140. FIG. 5B is another section view showing the rear housing 14 and the front frame 10 in FIG. 5A, wherein the trimming board 146 has separated from the housing body 140.

As shown in FIG. 5A and FIG. 5B, the first disassembly hole 104 located in the circular groove 102 of the front frame 10 and the second disassembly hole 144 of the rear housing 14 are communicated to each other. Therefore, under the condition that the trimming board 146 is engaged with the housing body 140 to cover and hide the first fastening member 20 fastened to the housing body 140, firstly the pulling portion 120c of the resilient member 12 can be pulled to separate from the circular groove 102 and thus to expose the first disassembly hole 104 (as shown in FIG. 2) as long as the first fastening member 20 is desired to be disassembled to separate the rear housing 14 from the front frame 10 (as shown in FIG. 5A). Afterwards, because the first disassembly hole 104 in the circular groove 102 of the front frame 10 and the second disassembly hole 144 of the rear housing 14 communicate to each other, the trimming board 146 engaged to the rear housing 14 can be pushed away from the housing body 140 through the first disassembly hole 104 of the front frame 10 and the second disassembly hole 144 of the rear housing 14 by any long and thin disassembly tool, such as a pin, a needle, a toothpick, and etc. So, the first fastening member 20 that is fastened in the first assembly hole 142 of the housing body 140 can be exposed and disassembled.

In the embodiment, in order to prevent the trimming board 146 engaged to the housing body 140 from unpredictably moving relative to the housing body 140, the trimming board 146 can further include a support pillar 146a. The support pillar 146a of the trimming board 146 is capable of passing through the second disassembly hole 144 of the housing body 140. Accordingly, after the trimming board 146 is engaged to the housing body 140, the support pillar 146a that is inserted into the second disassembly hole 144 can improve the positioning capability of the trimming board 146 relative to the housing body 140. Moreover, because the support pillar 146a of the trimming board 146 is inserted into the second disassembly hole 144 of the housing body 140, the disassembly tool for pushing the trimming board 146 away from the housing body 140 is unnecessarily too long, so as to decrease the time to find a proper disassembly tool and increase the convenience of disassembling the trimming board 146.

According to the foregoing recitations of the embodiments of the invention, it is obvious that the display module of the invention mainly includes following advantages. In order to achieve the design of hiding screws of the display module, the screw for fastening the rear housing to the front frame can be hid by the trimming board engaged on the rear housing. Besides, in order to disassemble the screw on the rear housing, the display module of the invention further includes a hidden disassembly hole on the front frame. The trimming board can be pushed apart from the rear housing through the disassembly hole, so as to expose the screw on the rear housing and thus the screw can be disassembled.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display module comprising:
a front frame comprising:
a frame body;
a circular groove being disposed along a periphery of the frame body; and
a first disassembly hole being located in the circular groove;
a resilient member, wherein a part of the resilient member is detachably engaged in the circular groove and covers the first disassembly hole;
a rear housing comprising:
a housing body being engaged with the frame body;
a first assembly hole being located on the housing body;
a second disassembly hole being located on the housing body and for communicating with the first disassembly hole; and
a trimming board being engaged with the housing body and for covering the first assembly hole and the second disassembly hole, wherein the trimming board further comprises a support pillar, and the support pillar passes through the second disassembly hole; and
a first fastening member for fastening the rear housing to the front frame through the first assembly hole.

2. The display module of claim 1, further comprising a glass panel, the frame body further comprising an external wall and a bearing portion, the circular groove being located between external wall and the bearing portion, the glass panel being fixed to the bearing portion, and the resilient member being located between the external wall and the glass panel.

3. The display module of claim 2, wherein the resilient member further comprises a buffer portion, the buffer portion is detachably engaged in the circular groove for covering the first disassembly hole.

4. The display module of claim 3, wherein the resilient member further comprises a plurality of clamped portions, the clamped portions connect to the buffer portion and are clamped between the glass panel and the bearing portion, so as to prevent the resilient member totally separating from the circular groove.

5. The display module of claim 4, wherein the frame body has a corner, the first disassembly hole is located in the circular groove and near the corner, the buffer portion further comprises a pulling portion, the pulling portion is detachably engaged in the circular groove and near the corner for covering the first disassembly hole.

6. The display module of claim 5, wherein the pulling portion is interconnected between two clamped portions.

7. The display module of claim 3, wherein the buffer portion is circular, the buffer portion is adapted to be entirely accommodated in the circular groove and located between the external wall and the glass panel.

* * * * *